(No Model.) 2 Sheets—Sheet 1.
G. T. SMALLWOOD.
INK ERASER.
No. 395,594. Patented Jan. 1, 1889.
FIG. I.
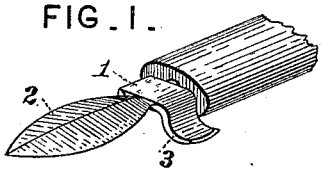
FIG. II.
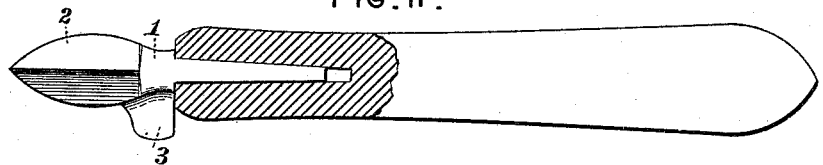
FIG. III.
FIG. IV.     FIG. VIII.
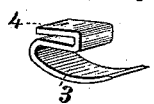 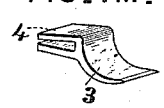
FIG. V.
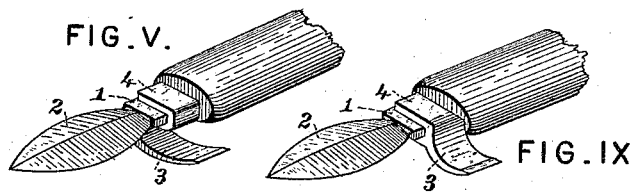 FIG. IX.
FIG. XI.
FIG. VI.    FIG. X.
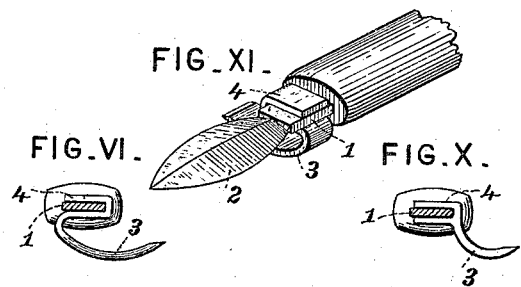
Attest:
Clement Smallwood
Emma Arthur
FIG. VII.
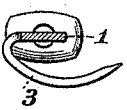
Inventor:
Geo. T. Smallwood.

(No Model.) 2 Sheets—Sheet 2.
G. T. SMALLWOOD.
INK ERASER.
No. 395,594. Patented Jan. 1, 1889.
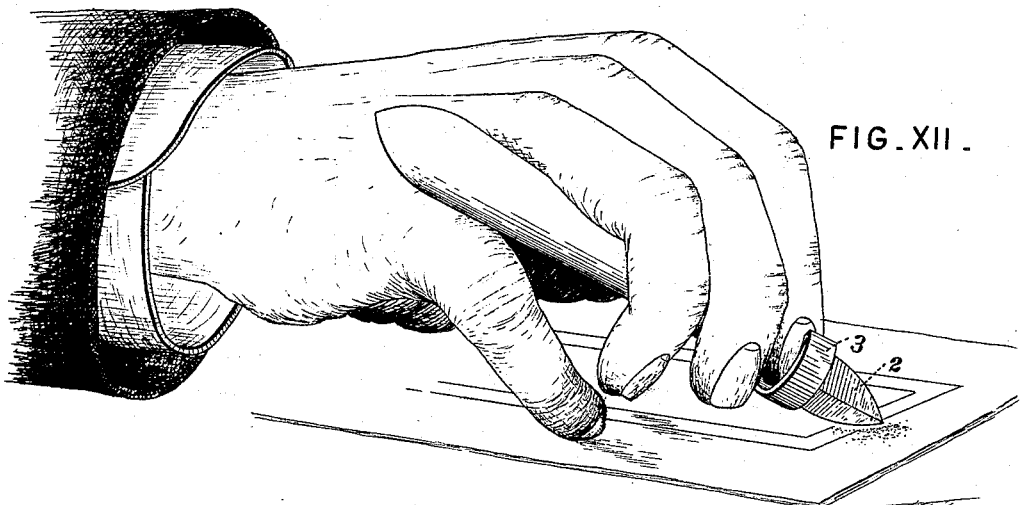
FIG. XII.
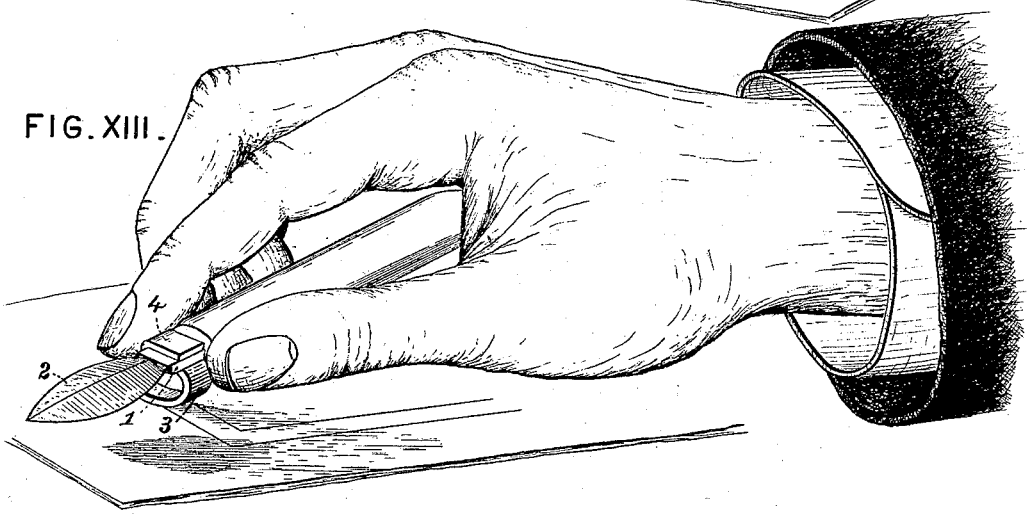
FIG. XIII.
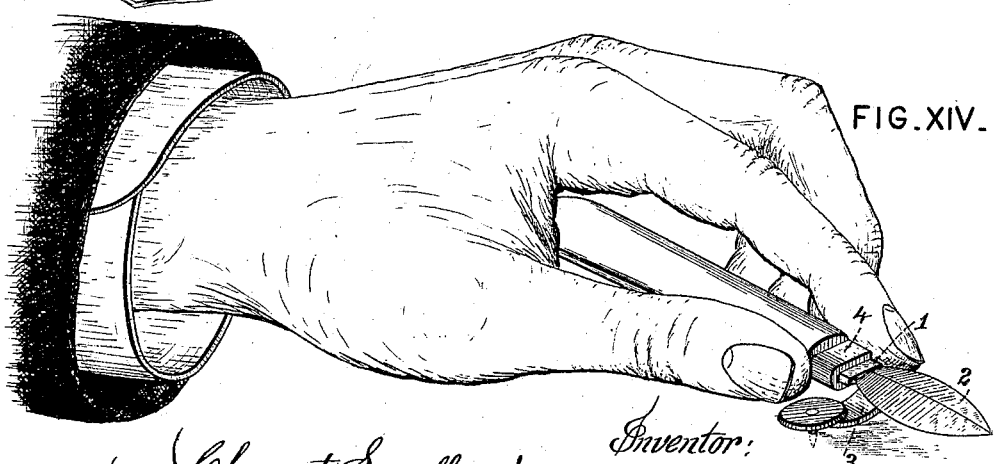
FIG. XIV.
Attest: Clement Smallwood
Emma Arthur.
Inventor:
Geo. T. Smallwood

UNITED STATES PATENT OFFICE.

GEORGE THOMAS SMALLWOOD, OF WASHINGTON, DISTRICT OF COLUMBIA.

INK-ERASER.

SPECIFICATION forming part of Letters Patent No. 395,594, dated January 1, 1889.

Application filed March 12, 1888. Serial No. 267,014. (No model.)

*To all whom it may concern:*

Be it known that I, GEORGE THOMAS SMALLWOOD, a citizen of the United States, residing at Washington, in the District of Columbia, have invented certain new and useful Improvements in Ink-Erasers; and I do hereby declare the following to be a full, clear, and exact description of the invention, such as will enable others skilled in the art to which it appertains to make and use the same.

The object of this invention is to provide for the use of book-keepers, draftsmen, and clerks a more complete and useful article in the form of an eraser; and it consists in certain features of novelty, which are hereinafter particularly pointed out in the claims, being first described with reference to the accompanying drawings, in which—

Figure I is a perspective view of one form of my invention. Fig. II is a plan view. Fig. III is an edge view. Figs. IV, V, VI, VII, and XI represent the preferred form of burnisher and extractor. Figs. VIII, IX, and X represent a modified form. Fig. XII illustrates the eraser in use. Fig. XIII illustrates the burnisher in use. Fig. XIV illustrates thumb-tack extractor in use.

The invention consists in providing the shank 1 of an eraser, 2, with a burnishing attachment, 3, which for draftsmen will serve the double purpose of burnisher and thumb-tack lifter or extractor. This attachment may be formed in one piece with the eraser, as seen in Figs. I, II, III, and VII, or may be made separately, as seen in Figs. IV and VIII, and clipped on, as seen in Figs. V, VI, VII, IX, X, and XI.

Figs. IV to VII, inclusive, represent the preferred form of burnisher 3, which is formed out of a flat piece of metal or a blank bent to the shape shown, the upper part, 4, serving as a clamp to hold the attachment to the eraser-shank 1. The modified form (shown in Figs. VIII, IX, and X) has the same portion, 4, to clamp it to the eraser, but has the burnishing portion projecting from the back of said clamp 4.

It will be seen that the attachment can be placed on either side of an eraser, as shown in Figs. V and XI, thus allowing of use with either the right or the left hand.

Having thus described my invention, the following is what I claim as new therein and desire to secure by Letters:

1. A burnishing attachment for an eraser formed in one piece and shaped so as to have one part form a clamp to secure it to the eraser and the other part to form a burnisher and extractor, substantially as shown and described.

2. A burnishing attachment for an eraser, shaped substantially as shown, its upper and lower portions serving for an attaching clamp and burnisher, respectively, as and for the purpose set forth.

In testimony whereof I have affixed my signature in presence of two witnesses.

GEORGE THOMAS SMALLWOOD.

Witnesses:
OCTAVIUS KNIGHT,
CLEMENT SMALLWOOD.